US012730066B2

(12) United States Patent
Hart et al.

(10) Patent No.: US 12,730,066 B2
(45) Date of Patent: Sep. 8, 2026

(54) METHOD FOR THREE-DIMENSIONAL (3D) IMAGE CALIBRATION FOR A SPECTRAL DOMAIN OPTICAL COHERENCE TOMOGRAPHY (OCT) SYSTEM

(71) Applicant: Leica Microsystems NC, Inc., Durham, NC (US)

(72) Inventors: Robert H. Hart, Durham, NC (US); Hansford Hendargo, Durham, NC (US)

(73) Assignee: LEICA MICROSYSTEMS NC, INC., Durham, NC (US)

( * ) Notice: Subject to any disclaimer, the term of this patent is extended or adjusted under 35 U.S.C. 154(b) by 142 days.

(21) Appl. No.: 18/599,288

(22) Filed: Mar. 8, 2024

(65) Prior Publication Data

US 2024/0302274 A1 Sep. 12, 2024

(30) Foreign Application Priority Data

Mar. 10, 2023 (EP) .................................... 23161338

(51) Int. Cl.
*G01N 21/45* (2006.01)

(52) U.S. Cl.
CPC ....... *G01N 21/45* (2013.01); *G01N 2201/104* (2013.01); *G01N 2201/127* (2013.01)

(58) Field of Classification Search
CPC ............. G01N 21/45; G01N 2201/104; G01N 2201/127; G01B 9/02091; G01B 9/02072
See application file for complete search history.

(56) References Cited

U.S. PATENT DOCUMENTS

2009/0185191 A1* 7/2009 Boppart ............... A61B 5/6852 356/479
2014/0107960 A1* 4/2014 Oritz Egea ............... G06T 5/80 702/104

(Continued)

OTHER PUBLICATIONS

Antony et al. "Automated 3-d method for the correction of axial artifacts in spectral-domain optical coherence tomography images", Biomedical Optics Express, vol. 2, No. 8, pp. 2403-2416 (Year: 2011).*

(Continued)

*Primary Examiner* — Kara E. Geisel
(74) *Attorney, Agent, or Firm* — LEYDIG, VOIT & MAYER, LTD.

(57) ABSTRACT

A method for three-dimensional (3D) image calibration for a spectral domain optical coherence tomography (OCT) system, the OCT system including a scanning arrangement for laterally scanning a sample light beam across a surface of a sample, an optical detection system for detecting light reflected back from the sample to obtain an optical image of the sample, and a reference light beam, the OCT system generating axially resolved optical information from the sample as the sample light beam is scanned laterally across the sample using optical path length differences (OPLD) between the reference light beam and the sample light beam, the method including: providing a calibration sample having a substrate having laterally arranged structural elements providing optical contrast, the structural elements having at least one of known dimensions or known position values on the substrate; scanning, using a first set of scanner parameters for the scanning arrangement, the sample light beam.

14 Claims, 8 Drawing Sheets

(56) References Cited

U.S. PATENT DOCUMENTS

| | | | | |
|---|---|---|---|---|
| 2015/0168250 | A1* | 6/2015 | Saxer ................. | G01B 9/02064 356/479 |
| 2019/0005682 | A1* | 1/2019 | Munro ............... | G02B 26/0833 |
| 2021/0169324 | A1* | 6/2021 | Tripathi ............... | H04N 13/156 |

OTHER PUBLICATIONS

Ourak et al., "Geometric Calibration of an OCT Imaging System", IEEE International Conference on Robotics and Automation (ICRA) May 21-25, 2018, Brisbane, Australia, pp. 3993-3999 (Year: 2018).*

* cited by examiner

METHOD FOR THREE-DIMENSIONAL (3D) IMAGE CALIBRATION FOR A SPECTRAL DOMAIN OPTICAL COHERENCE TOMOGRAPHY (OCT) SYSTEM

CROSS-REFERENCE TO PRIOR APPLICATION

Priority is claimed to European Patent Application No. EP 23161338.1, filed on Mar. 10, 2023, the entire disclosure of which is hereby incorporated by reference herein.

FIELD

The present disclosure relates generally to image calibration for optical systems. More specifically, the disclosure relates to a method for three-dimensional (3D) image calibration for a spectral domain optical coherence tomography (OCT) system.

BACKGROUND

Optical coherence tomography (OCT) is performed using an optical instrument which allows the generation of a cross-sectional image of biological tissue. It is possible to achieve axial resolutions well below 8 microns using monochromatic light having a constant phase difference which allows OCT scans to be useful in probing living tissue (in vivo) as well as in other applications. As OCT scans cannot penetrate to a great depth they are particularly useful for probing skin tissues and in ophthalmology.

The measuring principle of the OCT system relies on interference of light between a sample light beam scanning a sample and a reference light beam. Put differently, the OCT system comprises a coherent light source, an interferometer having a reference light beam path and a sample light beam path, an optical detector system and scan mirror arrangements allowing for the sample light beam to be scanned across the sample. Depth information of the sample is obtained by detecting and analysing the interference from backscattered light from different sample depths and light from the reference light beam path.

In more detail, the three-dimensional (3D) OCT imaging of a sample is achieved by combining optical information in the form of interferometric spectra obtained at a position of the sample light beam on the sample in an axial scan with lateral scanning of the sample light beam across the sample. The axial scan may be referred to as longitudinal scan, A-scan, or Z-scan and the lateral scan may be referred to as a B-scan or an XY-scan. The XY-scan may be performed in different lateral scanning patterns, including lines, raster scans, radial scans, circles, or other patterns. Thus, OCT images are obtained from optical interference signals while the OCT system is performing A-scans and XY-scans for a sample. Generally, the A-scans are made at a series of XY coordinates to obtain a volumetric image of a sample. In other words, an A-scan may be acquired at each point in an XY-scan of the sample to build up a complete three-dimensional OCT image of the sample.

With regards to lateral optical imaging, OCT systems conventionally use scanner arrangements, such as a galvanometer or micro-electromechanical system (MEMS) based mirrors systems to deflect the sample light beam laterally across the sample surface to obtain the 3D OCT images of the sample. OCT systems often require a calibration procedure to adjust system parameters, such as the drive voltages applied to the mirror arrangement, to ensure that the mirror scans through the appropriate angles to generate the desired field of view of the OCT system. However, improper calibration, non-linearities in the response of the mirror arrangement, or aberrations in the optics may result in artifacts in the OCT images due to the scanner arrangement not correctly directing the imaging beam to the expected location. To this end, artefacts may be a caused by several different factors such as variations in optical refraction of mirrors or lenses, light beam misalignment, sample tilt or the scanning procedure as such.

Although MEMS mirror arrangements are beneficial as they allow for miniaturization of the OCT system, fast scan speeds and cost-efficient manufacturing, the MEMS mirror arrangements may cause distortions in OCT images such as spherical, fan-shaped and keystone distortions.

With regards to axial optical imaging, optical path length differences (OPLD) between the reference light beam and the sample light beam generate the axial (Z-axis) information of the sample along the axial direction of the beam as it is scanned over the sample. Differences in the optical path length (OPL) can be caused either by variations in the sample itself, or from variations in the sample arm optics as the beam is scanned. Typically, variations due to the optics are minimized in design, but some residual OPLD may remain due to constraints on the optical design. For example, an inherent tilt in the optical beam in the sample light beam path, may result in an image of a flat surface appearing to be tilted. Or the thickness of a scanning lens may vary from its center to its outer edges and may result in an undesired intrinsic OPLD as the sample light beam is scanned across the sample. This could result in image distortions such as false non-linear effects. By way of example, an image of a flat surface or interface layer may appear curved in the obtained OCT images. Thus, these OPLD based artifacts may cause image artifacts in the OCT images if they are not corrected properly.

Based on the above, there is a need for improved OCT systems. There is especially a need for OCT systems and related methods for image calibration, such that the OCT imaging can be performed in a reliable manner with less image artefacts and without significant cost increases to the OCT systems.

SUMMARY

In an embodiment, the present invention provides a method for three-dimensional (3D) image calibration for a spectral domain optical coherence tomography (OCT) system, the OCT system including a scanning arrangement configured to laterally scan a sample light beam across a surface of a sample, an optical detection system configured to detect light reflected back from the sample to obtain an optical image of the sample, and a reference light beam, the OCT system being configured to generate axially resolved optical information from the sample as the sample light beam is scanned laterally across the sample using optical path length differences (OPLD) between the reference light beam and the sample light beam, the method comprising: providing a calibration sample comprising a substrate having laterally arranged structural elements providing optical contrast, the structural elements having at least one of known dimensions or known position values on the substrate; scanning, using a first set of scanner parameters for the scanning arrangement, the sample light beam laterally across a first two-dimensional scan area of the calibration sample so as to acquire a first image representation of structural elements of the calibration sample by the optical detection system; identifying structural features in the first image representation pertaining to the structural elements of the calibration sample; adjusting the first set of scanner parameters based on identified structural features in the first image representation to obtain a desired field of view (FoV), thereby obtaining a second set of scanner parameters; scanning, using the second set of scanner parameters, the sample light beam laterally across a second two-dimensional scan area pertaining to the desired field of view (FoV), so as to acquire a second image representation of structural features pertaining to the structural elements of the calibration sample by the optical detection system; identifying structural features in the second image representation pertaining to the structural elements of the calibration sample; correlating the at least one of known dimensions or known position values on the substrate for the structural elements corresponding to the identified structural features in the second image representation with corresponding scanner parameter values from the second set of scanner parameters; obtaining a mathematical relationship between the at least one of known dimensions or known position values and the corresponding scanner parameter values to calculate a lateral scanning distortion across the desired field of view (FoV); and correcting the lateral scanning distortion by adjusting the scanner parameters of the second set of scanner parameters using the mathematical relationship so as to obtain a calibrated set of scanner parameters for obtaining calibrated lateral images with the OCT system.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
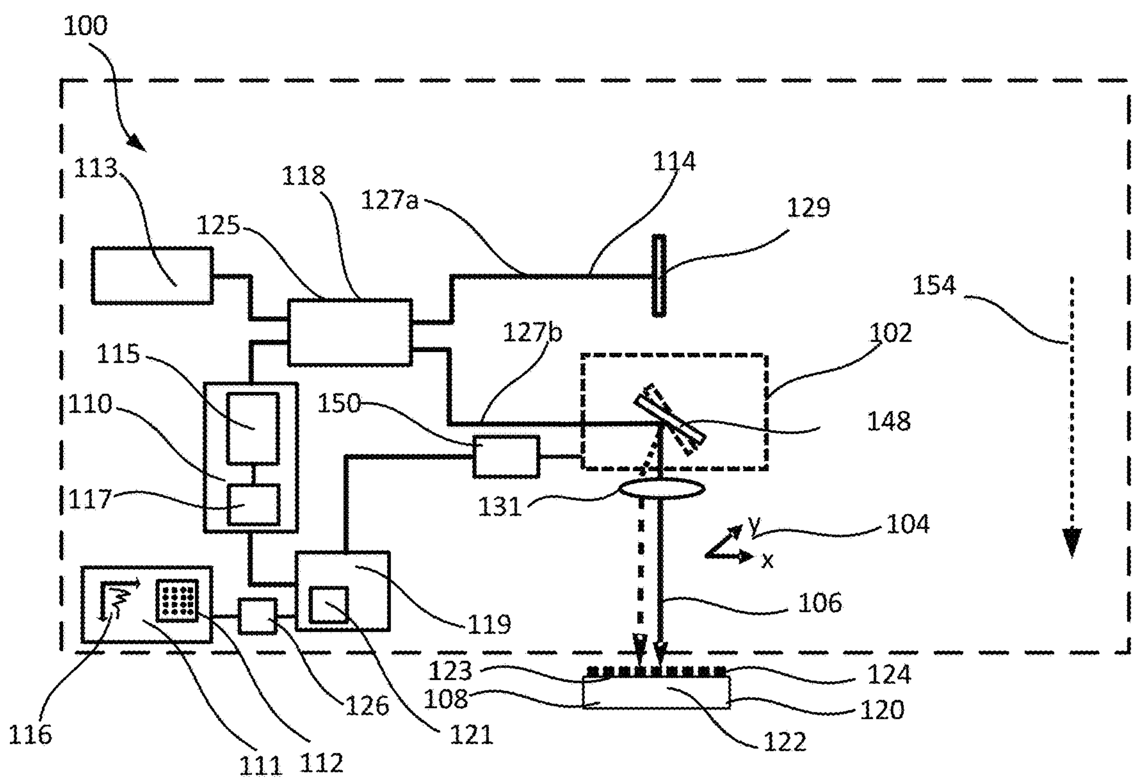
FIG. 1 shows schematically a spectral domain optical coherence tomography (OCT) system.

In an embodiment, the present invention provides technology that mitigates or obviates at least some of the limitations of OCT systems by providing an improved method for calibrating OCT images. In particular, but not exclusively, some embodiments of the disclosed technology provide improved image calibration for three-dimensional images obtained by OCT systems.

In an embodiment, the present invention provides technology that relates to a spectral domain optical coherence tomography (OCT) system. Some embodiments of the disclosed technology provide an OCT scanner having an optical configuration which supports a particularly compact housing design. Such a design is beneficial for use in surgical applications where the OCT scanner is provided as an adapter for a microscope. The OCT scanner may be based on micro-electromechanical system (MEMS) mirror arrangements as MEMS designs allow for miniaturization of the OCT system, fast scan speeds and cost-efficient manufacturing.

According to a first aspect of the disclosed technology there is provided a method for three-dimensional, 3D, image calibration for a spectral domain optical coherence tomography (OCT) system. The OCT system comprising: a scanning arrangement configured to laterally scan a sample light beam across a surface of a sample, an optical detection system configured to detect light reflected back from the sample such that an optical image of the sample is obtained, and a reference light beam, wherein the OCT system is configured to generate axially resolved optical information from the sample as the sample light beam is scanned laterally across the sample by using optical path length differences (OPLD) between the reference light beam and the sample light beam; the method comprising: providing a calibration sample comprising a substrate having laterally arranged structural elements providing optical contrast, the structural elements having at least one of known dimensions or known position values on the substrate; scanning, using a first set of scanner parameters for the scanning arrangement, the sample light beam laterally across a first two-dimensional scan area of the calibration sample such that a first image representation of structural elements of the calibration sample is acquired by the optical detection system; identifying structural features in the first image representation pertaining to the structural elements of the calibration sample; adjusting the first set of scanner parameters based on identified structural features in the first image representation to obtain a desired field of view, FoV, thereby obtaining a second set of scanner parameters; scanning, using the second set of scanner parameters, the sample light beam laterally across a second two-dimensional scan area pertaining to the desired field of view, FoV, such that a second image representation of structural features pertaining to the structural elements of the calibration sample is acquired by the optical detection system; identifying structural features in the second image representation pertaining to the structural elements of the calibration sample; correlating the at least one of known dimensions or known position values on the substrate for the structural elements corresponding to the identified structural features in the second image representation with corresponding scanner parameter values from the second set of scanner parameters; obtaining a mathematical relationship between the at least one of known dimensions or known position values and the corresponding scanner parameter values to calculate a lateral scanning distortion across the desired field of view, FoV; correcting the lateral scanning distortion by adjusting the scanner parameters of the second set of scanner parameters using the mathematical relationship, thereby obtaining a calibrated set of scanner parameters such that calibrated lateral images are obtained with the OCT system.

An advantage being that a method for calibrating an OCT system is provided. The method allows for a correction of image artefacts in at least two-dimensions. Put differently, an efficient method for correcting a lateral scanning distortion is further provided. Image artefacts due to, for example, variations in optical refraction of mirrors or lenses, light beam misalignment, sample tilt and/or a non-linear response or cross-talk between different drive voltage channels in the scanner arrangement may thereby be reduced. A more reliable OCT system is therefore provided. Calibrated OCT images may moreover be provided which is beneficial for instance for use in surgical applications.

Realtime image calibration may further be provided. Demands and limitations pertaining to post processing of image data may moreover be reduced or mitigated. OCT systems that provide better guidance to a surgeon or other users of the OCT system may be provided. To this end, easier assessment and analysis of the obtained OCT images are also provided. A method for image calibration is further provided that allows for compensation of image artefacts pertaining to environmental changes as well as complex changes to sample orientation or structure.

In some embodiments, the set of scanner parameters for the scanning arrangement may pertain to drive voltages for deflecting the scanner arrangement.

An advantage being that a more precise calibration is achieved. A linear relationship between deflection angle and drive voltage may be obtained. A relationship between scan area and drive voltage range applied to the scanner arrangement may further be obtained. An improved adjustment of scanner parameters may thereby be achieved. A more precise tuning of the desired field of view may further be achieved.

In some embodiments, the scanner arrangement may comprise a scanning mirror arrangement controlled by a scan controller. The drive voltages may be for deflecting the scanning mirror arrangement.

An advantage being that that an efficient scanning of the sample light beam may be achieved. The scanning mirror arrangement may be a MEMS mirror. Fast scan speeds and reduced footprint may be achieved by using a MEMS mirror.

In some embodiments, the identifying of the structural features in the first image representation may comprise at least one of filtering, thresholding or smoothening image data of the first image representation.

An advantage being that a more precise and robust identification of the spectral features may be obtained. A better comparison between identified structural features in the image representation and the structural elements on the substrate may thereby be obtained. A better adjustment of the first set of scanner parameters based on identified structural features in the first image representation may further be achieved. As a result, a more precise adjustment of desired field of view, FoV may be achieved.

In some embodiments, the method may further comprise: providing a calibration sample the method comprises a substrate having at least one structural element extending laterally on the substrate thereby providing optical contrast, the at least one structural element having known axial position values along the substrate, wherein the axial positions values are in an axial direction, the axial direction being perpendicular to the lateral scan of the sample light beam; scanning, using the calibrated set of scanner parameters, the sample light beam laterally across a third two-dimensional scan area pertaining to the desired field of view, FoV, such that a third image representation of the at least one structural feature is acquired by the optical detection system; determining axial position values along the axial direction for the at least one structural feature across the desired field of view, FoV; obtaining a mathematical relationship between the known axial position values and the determined axial position values to calculate an axial scanning distortion across the desired field of view, FoV; correcting the axial scanning distortion by adjusting the determined axial position values using the mathematical relationship to compensate for changes in optical path length (OPL) during the scanning across the third two-dimensional scan range, such that calibrated axial position values are obtained for the OCT system.

An advantage being that method for 3D calibration of system is provided. The method allowing for reduction of lateral image distortions as well as axial image distortions. Improved OCT images may thereby be provided. Put differently, the method allows for simultaneous correction of distortions such as image curvature in the lateral (XY plane) as well as distortions along the axial direction (e.g. curvature in the Z axis). Optical path length differences (OPLD) between the reference light beam and the sample light beam may, moreover, be corrected for as the sample light beam is laterally scanned across the calibration sample. In more detail, problems associated with differences in the OPL caused either by for instance variations in the sample itself, from vibration or variations in the path of the sample light beam as the beam is scanned may be mitigated. By way of example, an inherent tilt in path of the sample light beam may result in an image of a flat surface appearing to be tilted which can be corrected by the present method. In addition, problems associated with variations in thickness of lenses or other optical elements in the OCT system may be mitigated. Non-central light beam paths through optical lenses and other optical components of the OCT system may further be compensated for by the method.

In some embodiments, the determining of axial position values for the at least one structural feature of the calibration sample may comprise identifying minimum intensity, maximum intensity or a maximum difference in intensity along the axial direction across the desired field of view, FoV.

An advantage being that a more precise and robust identification of the at least one structural element may be obtained. A more robust determining of axial position values may be provided. The signal-to-noise or contrast in the image data pertaining to the image representation may be reduced while the method still being able to determine axial position values accurately. Automated procedures for determining the axial position values may further be implemented. A more consistent method may thereby be provided.

In some embodiments, the at least one structural element may be the surface of the substrate of the calibration sample.

An advantage being that a robust and consistent method for determining axial position values may be provided. Constraints on the calibration sample may further be reduced.

In some embodiments, the structural elements may be formed by uniformly sized and/or regularly spaced protruding elements.

An advantage being that a well-defined calibration sample is provided. An improved optical contrast may moreover be provided. A more accurate calibration of the OCT images may be achieved.

In some embodiments, the substrate of the calibration sample may be a flat substrate.

An advantage being a less complex calibration sample is provided.

In some embodiments, the mathematical relationship comprises a curve fitting function.

An advantage being that an efficient determining of the mathematical relationship between for instance the at least one of known dimensions or known position values and the corresponding scanner parameter values to calculate a lateral scanning distortion across the desired field of view may be achieved. An improved correction of the lateral scanning distortion may thereby be obtained. An efficient determining of the mathematical relationship between the known axial position values and the determined axial position values may, moreover, be achieved by the curve fitting. An improved correction of the axial scanning distortion may thereby be obtained. The curve fitting function further allows for efficient interpolation of image data allowing for an increased number of data points in between the known data points. A more precise calibration may thereby be obtained.

In some embodiments, the curve fitting function may be a polynomial function.

An advantage being that an efficient curve fit may be achieved.

In some embodiments, the method may further comprise: assessing by mathematical analysis the quality of the curve fitting function.

An advantage being that the accuracy of the curve fitting may be assessed. The mathematical analysis may by way of example be a residual map. A threshold value for the quality of curve fitting may moreover be set. An assessment of the quality resulting below the threshold value may prompt a new scan of the calibration sample. Alternatively, a new curve fitting function or new curve fit may be applied.

In some embodiments, the method may comprise: providing a calibration sample comprising substrate having a curved structural element thereon. The curved structural element may be an anatomical layer in a specimen.

In some embodiments, the method may comprise scanning, using the calibrated set of scanner parameters, the sample light beam laterally across a fourth two-dimensional scan area pertaining to the desired field of view, FoV, such that a fourth image representation of the curved structural element of the calibration sample is acquired by the optical detection system. The method further comprises identifying a curved structural feature pertaining to the curved structural element of the calibration sample in the fourth image representation. The method further comprises determining axial position values along the axial direction for the curved structural feature across the desired field of view, FoV, and obtaining a mathematical relationship for the determined axial position values for the curved structural feature.

The method further comprises applying a flattening transformation on the mathematical relationship for the determined axial position values to obtain a constant axial position value along the curved structural feature such that an image representation comprising an iso-surface for the curved structural feature is obtained.

An advantage that method may be applied for optical sectioning of anatomical layers in a curved sample, such as the cornea or retina. Put differently, by detecting a curved feature of interest, such as the inner retinal layer or corneal epithelium, and computing an axial shift (Z-shift) in the image representation of the curved structural feature at each position may allow a similar flattening. By way of example, this may enable optical sectioning in the XY plane and creation of en face images that are contoured to the sample curvature allowing visualization of iso-surfaces for different anatomical layers.

In some embodiments, the curved structural element may be an anatomical layer in a specimen.

An advantage being that the method may be applied to sample of relevance for OCT imaging. The flattening of curved structural features may be performed while investigating an anatomical specimen.

A second aspect of the disclosed technology comprises a computer program with a program code for performing the method according to the first aspect when the computer program is run on a processor.

Effects and features of the second aspect are to a large extent analogous to those described above in connection with the first aspect. Embodiments mentioned in relation to the first aspect are largely compatible with the second aspect.

The detailed description set forth below provides examples of embodiments of the disclosed technology which are explained in sufficient detail to enable those skilled in the art to put the disclosed technology into practice.

There are two forms of OCT scanning, time-domain OCT (TD-OCT) and spectral domain OCT (SD-OCT). SD-OCT uses spectral interrogation of the spectrum at the OCT interferometer output. FIG. 1 schematically shows the principles of operation of an example spectral domain optical coherence tomography, SD-OCT system 100 which some embodiments of the disclosed technology may be used to implement. The SD-OCT system may interchangeable in the following be referred to as an OCT system. The example OCT system 100 shown in FIG. 1 according to the disclosed technology may be used to generate optical coherence tomograms of in-vivo tissue samples, such as of a human eye. FIG. 1 is schematic only and is drawn not to scale and the position of various components and their relative sizes do not necessarily reflect their relative positions or sizes in embodiments of the disclosed technology.

FIG. 1 shows a spectral domain optical coherence tomography (OCT) system 100. The OCT system 100 comprising: a scanning arrangement 102 configured to laterally scan 104 a sample light beam 106 across a sample 108.

The OTC system 100 further comprising an optical detection system 110 configured to detect light reflected back from the sample 108 such that an optical image 112 of the sample 108 is obtained, and a reference light beam 114, wherein the OCT system 100 is configured to generate axially resolved optical information 116 from the sample 108 as the sample light beam 106 is scanned laterally 104 across the sample 108 by using optical path length OPL differences 118 between the reference light beam 114 and the sample light beam 106. An example optical image 112 is illustrated in FIG. 1 as displayed on a computer display 111 of the OCT system. The optical image 112 comprises a lateral scan (XY-scan) image and an axial scan (z-scan) image. The sample 108 may be a calibration sample 120. The calibration sample 120 may comprise a substrate 122 having laterally arranged structural elements 124 providing optical contrast. The structural elements 124 may have at least one of known dimensions or known position values on the substrate 122 as will be discussed. By way of example, the substrate 122 may be a glass substrate. The structural elements 124 may be metallic structures provided on a surface 123 of the substrate 122. The structural elements 124 may be formed by uniformly sized and/or regularly spaced protruding elements.

The example OCT system 100 may use a low coherence broadband optical light source 113. The optical detection system 110 may further comprise a spectrometer 115 configured to obtain spectral information and a photodetector arrangement 117 configured to detect light intensity. The OCT system 100 may comprise an image acquisition unit 119. The image acquisition unit 119 is configured to control the OCT system 100 such that OCT images 112 may be obtained. The image acquisition unit 119 may comprise a processor 121. The processor 121 may form part of a computer system 126. The OCT images 112 may be displayed on a computer display 111 connected to the computer 126. The image acquisition unit 119 may be configured to control the scanning arrangement 102. The image acquisition unit 119 may be configured to process image data obtained by the optical detection system 110. The image acquisition unit 119 may be connected to the optical detection system 110.

As shown in FIG. 1, a suitable broad-beam low coherence OCT light source 113 may be used to generate the sample light beam 106 scanning the sample 108. One example broadband OCT light source 113 has a central wavelength of 860 nm, with a bandwidth of 100 nm. One or more light sources 113 may be used to provide the broad-band low coherence OCT light source over the desired bandwidth. The light source 113 may, by way of example, be a broadband light source such as light emitting diode (LED), a super luminescent diode (SLD), or a supercontinuum source.

In more detail, the function of the OCT system is based on interference between the reference light beam 114 and the sample light beam 106. The interference may be understood to be between a reference light beam path and a sample light beam path along which the reference light beam 114 and the sample light beam 106 propagate respectively. Depth information of the sample is obtained by detecting and analysing the interference from backscattered light from different sample depths and light from the reference light beam path. Put differently, OPLD may be used to obtain the depth information along a axial direction of the sample.

By way of example, light from the light source 113 may pass through a light coupler 125 which splits the light into the reference beam 114 which follows a reference light beam path 127*a* and the sample light beam 106 which follows a sample light beam path 127*b*. The reference light beam path 127*a* may comprise a reference mirror 129 reflecting the reference light beam 114. Light returned from the reference light beam path 127*a* and the sample light beam path 127*b* may interfere in the coupler 125 to the optical detection system 110. Light from the sample light beam 106 backscattered or reflected or otherwise returned from the sample 108 may thereby provide optical information pertaining to the sample 108.

In some embodiments, one or more of the reference light beam path 127*a* or the sample light beam path 127*b*, may be provided using suitable single-mode optical fibres and/or include one or more sections where a beam following the optical fibre travels in free space. In some embodiments of the disclosed technology, although the optical path lengths of the reference light beam path 127*a* and sample light beam path 127*b* are matched, the dispersive properties of the optical fibre each beam travels along may differ to improve the removal of a complex conjugate image from the OCT image 112 output. A variety of other techniques may be used in other embodiments of the disclosed technology to reduce or remove the presence of a complex conjugate image in the OCT image 112 output.

In the example shown schematically in FIG. 1 of OCT system 100, the light source 113 generates an OCT scanning or sample light beam 106 which illuminates the sample 108 being scanned over a range of wavelengths, and all are measured simultaneously using the spectrometer 115 or other suitable type of interference detector. The spectrometer 115 measures spectral interference from the sample reflected sample light beam 106. In other words, intensity modulations in the returned light as a function of frequency is measured. The rate of variation of intensity over different frequencies may be indicative of the location of the different reflecting layers in the samples.

The sample light beam 106 of the OCT system 100 is may be directed via a an objective lens 131 towards a focal point on the sample 108, the focal point being laterally scanned. 104. A scan mirror arrangement 148 allows the sample light beam to be laterally scanned 104 across the sample 108. Depth information of the sample 108 may thereby be obtained laterally by detecting and analysing, from different positions across the sample 108, the interference from backscattered light from different sample depths and light from the reference light beam path.

The scanner arrangement 102 of the OCT system 100 may comprise a scanning mirror arrangement 148 controlled by a scan controller 150. The scan controller 150 may be controlled by the image acquisition unit 119. The scanning mirror arrangement 148 may be a micro-electromechanical system (MEMS) based mirror. The scanning mirror arrangement 148 may alternatively be a galvanometer-based mirror arrangement. An axial direction 154 is illustrated in FIG. 1 as a reference. The axial direction 154 may be orthogonal to the plane of the lateral scan 104.

The OCT system 100 may be incorporated into or attached to a surgical microscope.

Figure 2:
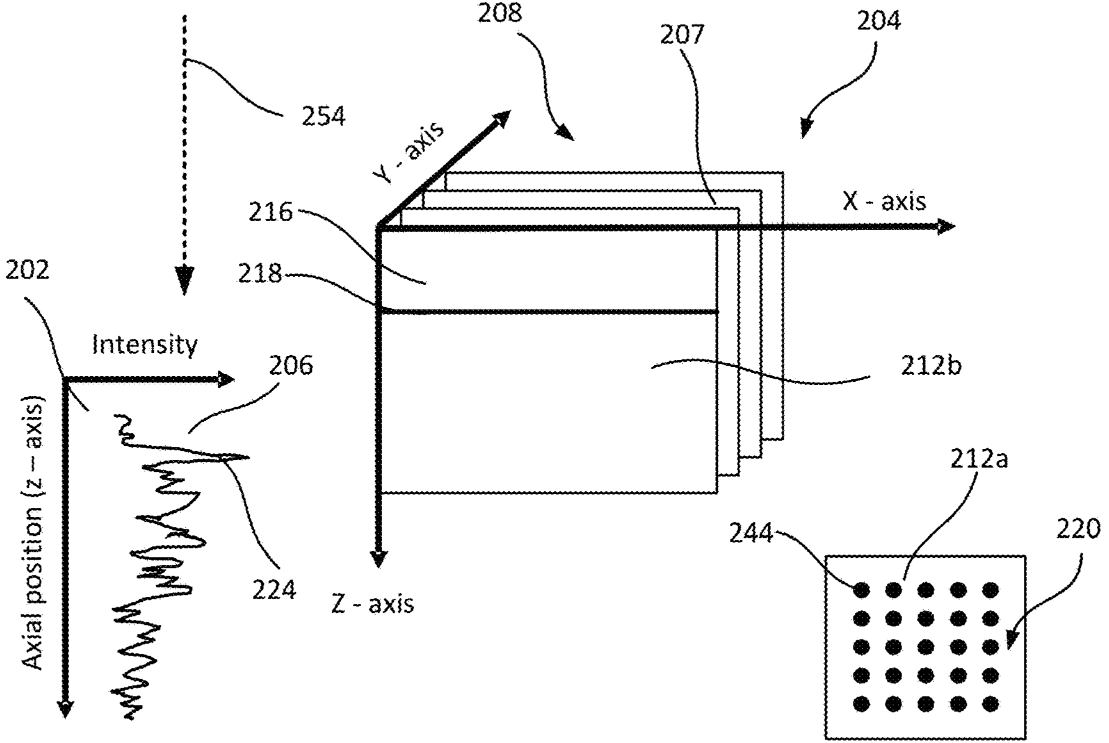
FIG. 2 shows schematically optical images acquired by the OCT system.

FIG. 2 shows schematically two optical images 212*a*, 212*b* acquired by the OCT system 100 of FIG. 1. The optical image 212*a* is acquired by the lateral scan 104 generated by scanning the scanning arrangement 102 such that the sample light beam 106 is scanned across the sample 108 and light is reflected or back scattered or otherwise returned to the optical detection system 110 as described in FIG. 1.

In more detail, a three-dimensional (3D) OCT optical image 212*a* of a sample 108 is achieved by combining axially resolved optical information 216 in the form of interferometric spectra 206 obtained at a position of the sample light beam 106 on the sample 108 in an axial scan 202 with lateral scanning 204 of the sample light beam 106 across the sample 108. The axial scan 202 may be referred to as longitudinal scan, A-scan, or Z-scan and the lateral scan 204 may be referred to as a B-scan or an XY-scan, as illustrated in FIG. 2. The axial scan 202 may be along an axial direction 254. The axial direction 254 may be perpendicular to the lateral scan 204. In other words, the Z-direction 254 may be perpendicular to the XY-scan 204. The XY-scan 204 may further be performed in different lateral scanning patterns, such as scan lines 207 as illustrated in FIG. 2. Thus, OCT images 212*a*, 212*b* are obtained from optical interference signals while the OCT system is performing A-scans and XY-scans for the sample 108 of FIG. 1.

In other words, for each sample point, the reference mirror 129 of the OCT system 100 may be scanned and the light intensity is recorded. This allows a complete depth profile of the sample reflectivity at the sample light beam 106 position to be generated along the axial direction. The A-scans may be made at a series of XY coordinates to obtain a volumetric image 208 of the sample 108. In other words, an A-scan may be acquired at each point in an XY-scan of the sample to build up a complete three-dimensional OCT image of the sample. The three-dimensional (3D) OCT image may be referred to as a volumetric OCT image 208. The OCT image 212*a* illustrates a lateral scan 204 of the calibration sample 120 of FIG. 1. By way of example, the calibration sample 120 comprising a substrate 122. The substrate 122 having laterally arranged structural elements 224 providing optical contrast. The structural elements 224 have at least one of known dimensions or known position values on the substrate 222 as will be discussed. By way of example, the substrate 122 may be a glass substrate. The structural elements may be metallic structures provided on the surface 123 of the substrate 122.

The OCT optical image 212*b* illustrates by way of example a ZX-scan in which an image representation 218 of the surface 123 of substrate 122 is observable.

In more detail intensity modulations in the returned light as a function of frequency may be measured by the OCT system 100. The rate of variation of intensity over different frequencies may be indicative of the location of the different reflecting layers in the samples. The axial scan 202 of FIG. 2 further illustrates depth information along the axial direction 254. An intensity peak 224 in the light intensity indicates the surface 123.

The OCT optical image 212*a* illustrates by way of example a XY-scan in which an image representation 220 of the structural features 244 pertaining to the structural elements 124 of the substrate 122 is observable.

Figure 3:
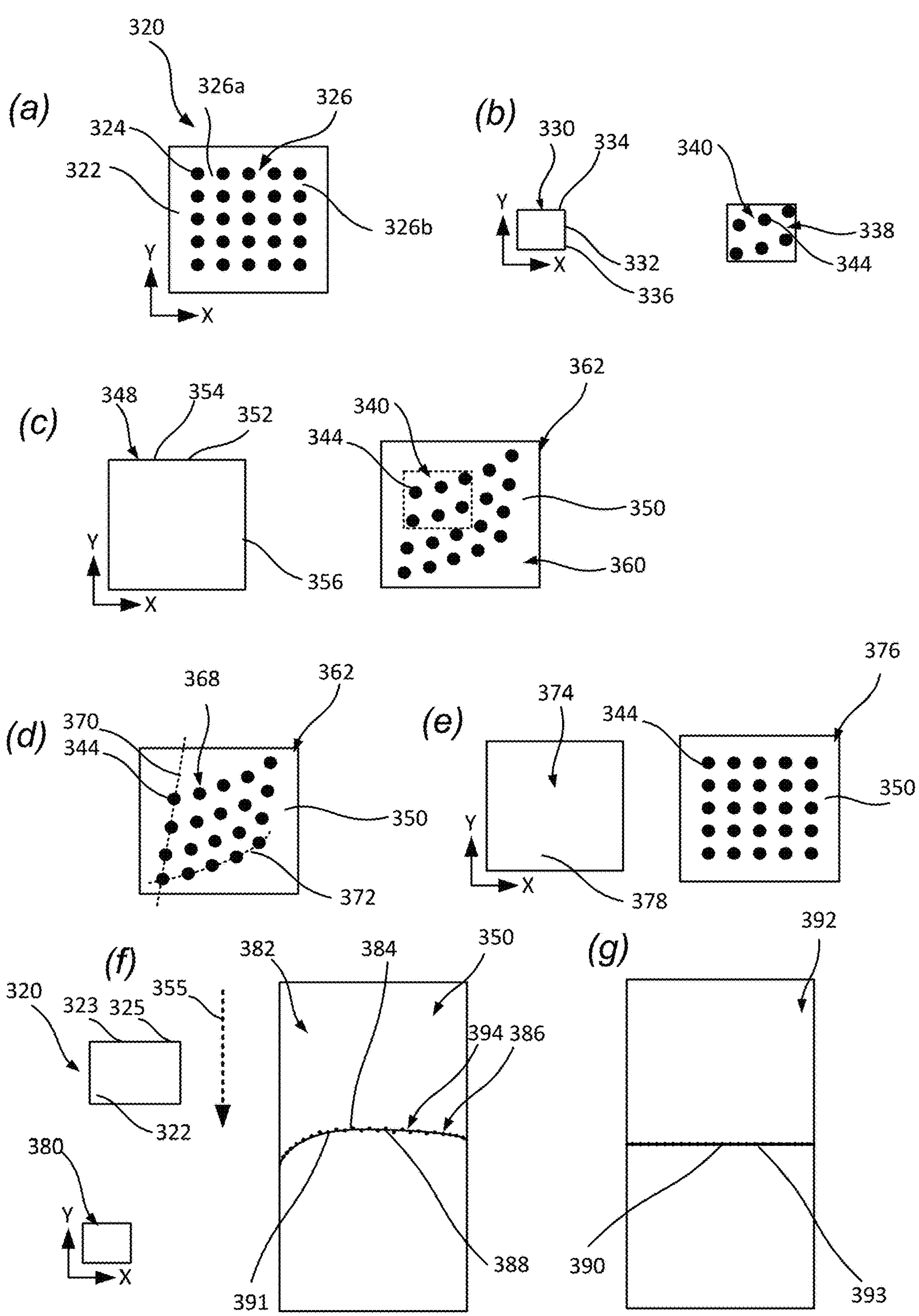
FIG. 3 illustrates optical calibration samples and optical information acquired using the OCT system.
Figure 4:
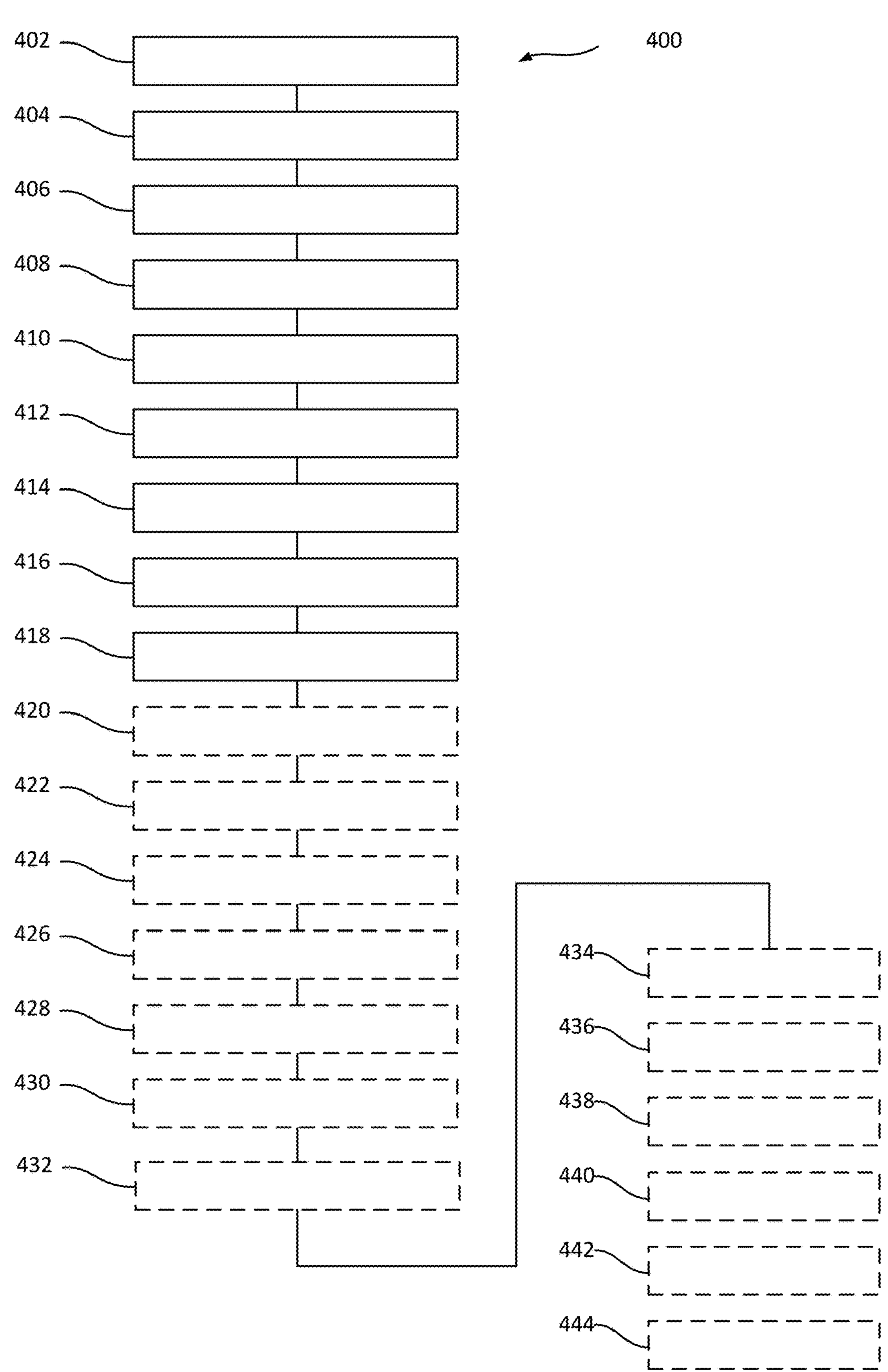
FIG. 4 illustrates a general block diagram showing the method according to some embodiments.

With reference to FIGS. 3 and FIG. 4, a method 400 for three-dimensional (3D) image calibration for a spectral domain optical coherence tomography (OCT) system is described. FIG. 3 illustrate optical information acquired using the OCT system. FIG. 4 illustrates a general block diagram showing the method 400 according to some embodiments of the present disclosure. The OCT system may be the OCT system 100 described in connection with FIGS. 1 and 2.

The method 400 comprising: providing 402 a calibration sample 320. The calibration sample 320 comprising a substrate 322 having laterally arranged structural elements 324 providing optical contrast, see FIG. 3*a*. The structural elements 324 have at least one of known dimensions or known position values on the substrate 322. By way of example, a distance 326 between the structural elements 324 is known. The distance 326 is here known in a first direction 326*a* and a second direction 326*b*. The first direction 326*a* may be along a X-direction of the sample 320. The second direction 326*b* may be along a Y-direction of the sample 320.

With reference to FIG. 3*b*, the method 400 further comprises scanning 404, using a first set of scanner parameters 330 for the scanning arrangement 102, as described related to FIG. 1. The first set of scanner parameters 330 may pertain to drive voltages 332 and are illustrated in FIG. 3*b*. The drive voltages 332 are further illustrated in FIG. 3*b* as ranges dVX1 334 and dVY1 336, where dVX1 and dVY1 pertain respectively to drive voltage ranges in the X-direction and the Y-direction of the OCT system 100.

The scanning 404 causes the sample light beam 106 to be scanned laterally across a first two-dimensional scan area 338 of the calibration sample 320 such that a first image representation 340 of the structural elements 324 of the calibration sample 320 is acquired by the optical detection system 110. FIG. 3*b* schematically illustrated the first two-dimensional scan area 338 and the first image representation 340.

The method 400 further comprises identifying 406 structural features 344 in the first image representation 340 pertaining to the structural elements 324 of the calibration sample 320, see FIG. 3*b*. In other words, the structural features 344 are image representations of the structural elements 324, as imaged by the OCT system 100.

By way of example, six structural features 344 are identified 406 in the first image representation 340. Put differently, only a portion of the structural elements 324 are imaged. To provide an improved imaging of the sample 320, the method 400 may further comprise adjusting 408 the first set of scanner parameters 330 based on identified structural features 344 in the first image representation 340 to obtain a second set of scanner parameters 348, see FIG. 3*c*. A desired field of view, FoV, 350 may thereby be obtained by the second set of scanner parameters 348. Put differently, the second set of scanner parameters 348 may pertain to adjusted drive voltages 352. The use of the second set of scanner parameters 348 may thereby provide a scanning area corresponding to the desired field of view, FoV, 350. The adjusted drive voltages 352 are illustrated in FIG. 3*c* as dVX2 354 and dVY2 356, where dVX2 and dVY2 pertain respectively to adjusted drive voltage ranges in the X-direction and the Y-direction of the OCT system 100.

By way of example the drive voltages are adjusted from dVX1 334 and dVY1 336 of FIG. 3*b* to dVX2 354 and dVY2 356 of FIG. 3*c*, respectively. According to this example a larger region of the calibration sample 320 is imaged as illustrated by the larger desired field of view, FoV, 350. Hence, a larger number of structural features 344 may be identified.

In more detail, the method 400 may further comprise scanning 410, using the second set of scanner parameters 348, the sample light beam 106 laterally across a second two-dimensional scan area 360 pertaining to the desired field of view, FoV 350 such that a second image representation 362 of structural elements 324 of the calibration sample 320 is acquired by the optical detection system 110 of the OCT system 100. The method 400 further comprises identifying 412 structural features 344 in the second image representation 362 pertaining to the structural elements 324 of the calibration sample 320 and correlating 414 the at least one of known dimensions or known position values on the substrate 322 for the structural elements 324 corresponding to the identified structural features 344 identified in the second image representation 362 with corresponding scanner parameter values from the second set of scanner parameters 348. The structural features 344 pertains to the structural elements 324 of the calibration sample 320. By way of example and for illustration purposes, the first image representation 340 is overlaid in the second image representation 362.

Put differently, the identified features 344 may be correlated one-to-one with the at least one of the known dimensions or known positions values on the substrate. In other words, scanner parameters values may be correlated with individual structural features in the second image representation. A direct link between scanner parameter values and known dimensions or known position values may thereby be obtained. Put differently, known dimensions and/or distances between the structural elements may be utilized to determine a correlation between scanner parameter values and distance. Known dimensions and/or distances between the structural elements may thereby be utilized to determine a correlation between drive voltages and distance. The distance may, by way of example, be expressed in millimetres or in micrometres.

The method 400 may further comprise obtaining 416 a mathematical relationship between the at least one of known dimensions or known position values and the corresponding scanner parameter values to calculate a lateral scanning distortion 368 across the desired field of view, FoV 350.

By way of example, the second image representation 362 illustrates in FIG. 3*d*, a lateral scanning distortion 368 in the form of a shift 370 and a non-linear displacement 372 of the structural features 344 relative to each other. In other words, a periodic arrangement of the structural elements 324 of the calibration sample 320 is distorted in the second image representation 362, as illustrated be the dashed lines 370 and 372.

By obtaining 416 the mathematical relationship between the at least one of known dimensions or known position values and the corresponding scanner parameter values to calculate a lateral scanning distortion 368 across the desired field of view, FoV 350 the lateral scanning distortion 368 may be quantified. By use of the mathematical relationship the method 400 may comprise correcting 418 the lateral scanning distortion 368 by adjusting the scanner parameters of the second set of scanner parameters 348 using the mathematical relationship, thereby obtaining a calibrated set of scanner parameters 374 such that calibrated lateral images 376 are obtained with the OCT system 100. In FIG. 3*e*, a calibrated lateral image 376 of the calibration sample 320 is illustrated together with the calibrated lateral scan area 378 pertaining to the calibrated set of scanner parameters 374. The periodic arrangement of the structural elements 324 of the calibration sample 320 is thereby visible as a periodic arrangement of structural features 344 in the calibrated lateral image 376. The method 400, thereby allows for reduction of lateral scanning distortions 368 for the OCT system 100.

As described above the set of scanner parameters for the scanning arrangement may pertain to drive voltages for deflecting the scanner arrangement. The drive voltages and the deflection may be linear relationship.

The scanner arrangement may comprise a scanning mirror arrangement controlled by a scan controller. The scan controller may be configured to control the drive voltages for the scanner arrangement. Put differently, the scan controller to control the scan operation of the scanning mirror arrangement. The scanning mirror arrangement may deflect the sample light beam from the light source in a first angle range. The scanning mirror arrangement may deflect the sample light beam from the light source in a second angle range. The first and the second angle ranges may be orthogonal. A two-dimensional scan area may thereby be obtained.

The OCT scanning controller may be controlled by a control computer that is configured to synchronize, drive, trigger, store and acquiring image data, and/or performing signal and image processing necessary to obtain image representations of the scanned sample. The control computer may comprise a display arrangement for displaying the image representations.

The identifying 406 of structural features 344 in the first image representation 340 may comprise at least one of filtering, thresholding or smoothening image data of the first image representation 340.

To this end, the identifying 412 of structural features 324 in the second image representation 362 may further comprise at least one of filtering, thresholding or smoothening image data of the second image representation 362.

An improved identification 406, 412 of the structural features 344 pertaining to the structural elements 324 of the sample 320 may thereby be achieved. A more robust identification 406, 412 of the structural features 344 allows for an improved correlation 364 of the at least one of known dimensions or known position values on the substrate 320 for the structural features 344 identified in the first or second image representation 340, 362. Put differently, the least one of filtering, thresholding or smoothening image data of the first or second image representation 340, 362 may changing the appearance of the image representation by for example altering the intensity values of a pixels of an image, increase contrast, reduce noise as well as adding a variety of special effects such as non-linear thresholds, sharpening and increasing edge detection. The filtering may suppress high (i.e. smoothing techniques) and low frequencies (i.e. image enhancement, edge detection) occurring in the image representation.

With reference to FIG. 4 and FIGS. 3*f* and 3*g*, the method 400 may further comprise: providing 420 a calibration sample 320 comprising a substrate 322 having at least one structural element 325 extending laterally on the substrate 322 thereby providing optical contrast. By way of example, the at least one structural element 325 is the surface 323 the substrate 322 of the calibration sample 320. By way of example, the calibration sample 320 has a flat substrate 322. The flat substrate 322 may have a flat surface 323.

According to other examples, the at least one structural element may be a structural element extending laterally across the surface. Alternately, the at least one structural element may be an interface layer within a sample. The interface layer providing optical contrast. The at least one structural element may in other examples be in the form of structural elements arranged laterally across a calibration sample. The structural elements having known axial positions along the calibration sample.

The at least one structural element 325 has known axial position values along the substrate 322. Put differently, the location of the at least one structural element 325 is known in an axial direction 355 across the calibration sample 320. The axial positions values are defined in the axial direction 355, the axial direction 355 being perpendicular to the lateral scan of the sample light beam, described above. The method 400 may further comprise scanning 422, using the calibrated set of scanner parameters 374, the sample light beam 106 laterally across a third two-dimensional scan area 380 pertaining to the desired field of view, FoV 350, such that a third image representation 382 of the at least one structural feature 384 is acquired by the optical detection system 110. The at least one structural feature 384 corresponding to the at least one structural element 325.

The method 400 may further comprise determining 424 axial position values along the axial direction 355 for the at least one structural feature 384 across the desired field of view, FoV 350 and obtaining 426 a mathematical relationship between the known axial position values and the determined axial position values to calculate an axial scanning distortion 386 across the desired field of view, FoV.

By way of example, the third image representation 382 illustrates in FIG. 3*f*, an axial scanning distortion 386 in the form of a non-linear displacement 391 of the at least one structural feature 325. In other words, the surface 323 of the sample 320 is distorted in the third image representation 382, as illustrated be the circular data points 388 representing image data pertaining to the surface 323 as imaged by the OCT system 100.

By obtaining 426 a mathematical relationship between the known axial position values and the determined axial position values to calculate an axial scanning distortion 386 across the desired field of view, FoV may be quantified.

By use of the mathematical relationship between the known axial position values and the determined axial position values the method 400 may further comprise correcting 428 the axial scanning distortion 386 by adjusting the determined axial position values using the mathematical relationship to compensate for changes in optical path length (OPL) during the scanning across the third two-dimensional scan area 380, such that calibrated axial position values 390 are obtained for the OCT system 100. Calibrated axial images 392 may thereby be obtained with the OCT system 100.

The flat surface 323 is thereby visible as a straight line 393 in the calibrated axial image 392, see FIG. 3*g*. The method 400, thereby allows for reduction of axial scanning distortions 386 for the OCT system 100.

The mathematical relationship may comprise a curve fitting function 394. By way of example, the curve fitting may be a polynomial function. A curve fit 394 to the circular data points 388 representing image data pertaining to the imaged surface 323 is illustrated in FIG. 3*f*.

The curve fitting 394 may allow for efficient interpolation of the image data allowing for an increased number of data points in between the known data points. A more precise calibration may thereby be obtained. An improved correction of the axial scanning distortion may thereby be obtained.

The determining 424 of axial position values for the at least one structural element 325 of the calibration sample 320 may comprise identifying 430 minimum intensity, maximum intensity or a maximum difference in intensity along the axial 354 direction across the desired field of view, FoV.

The method 400 may further comprises: assessing 432 by mathematical analysis the quality of the curve fitting function. An advantage being that the accuracy of the curve fitting may be assessed. The mathematical analysis may by way of example be a residual map. A threshold value for the quality of curve fitting may moreover be set. An assessment of the quality resulting below the threshold value may prompt a new scan of the calibration sample.

Figure 5:
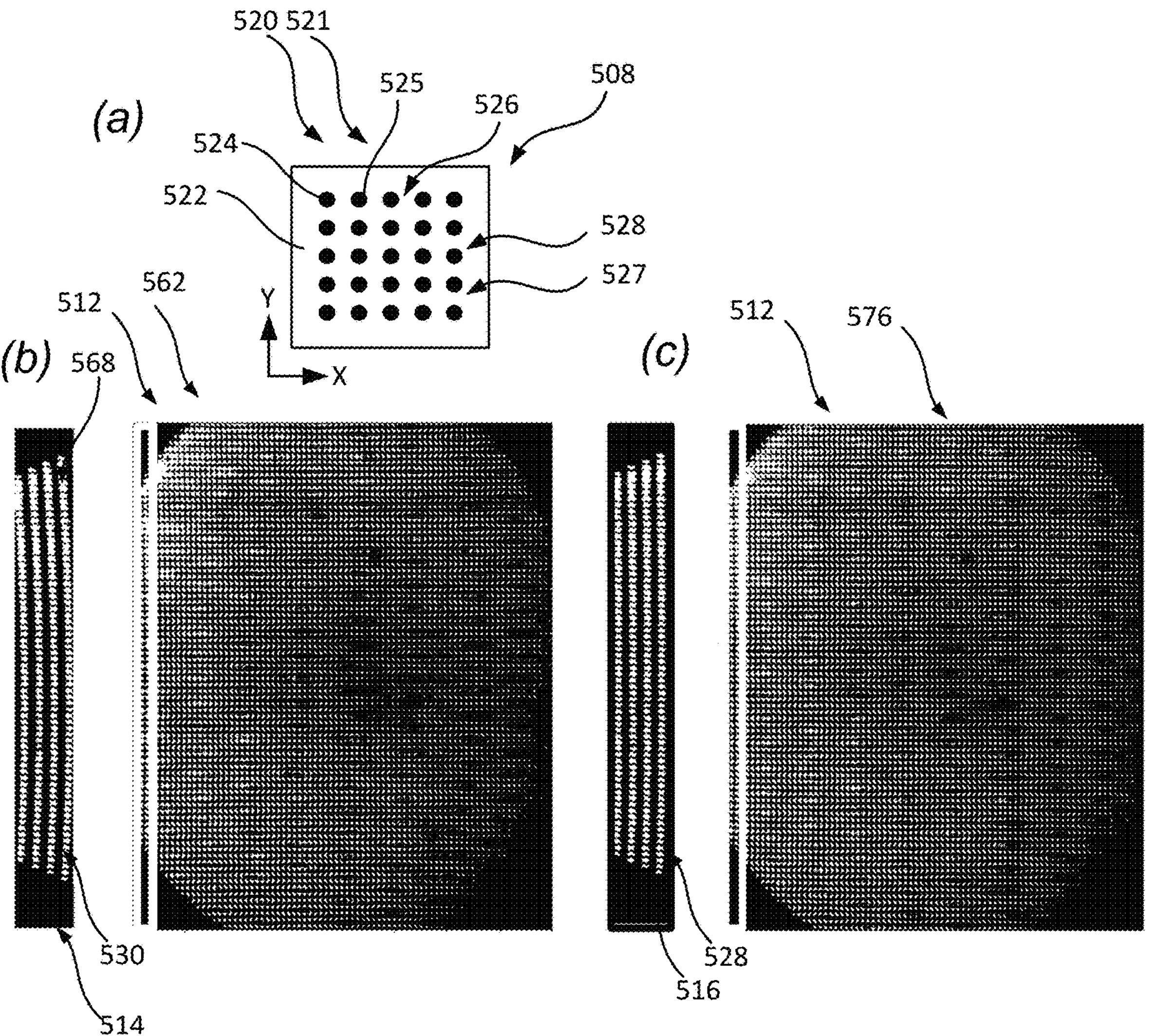
FIG. 5 illustrates by way of example a lateral scanning artefact in an OCT image obtained by the OCT system.

FIG. 5 illustrates by way of example a lateral scanning artefact in an OCT image 512 obtained experimentally by the OCT system 100. In more detail, the sample 508 is in the form of a calibration sample 520. The calibration sample 520 comprising a substrate 522 having laterally arranged structural elements 524 providing optical contrast as illustrated by a sub-portion 521 of the calibration sample 520 in FIG. 5*a*. The structural elements 524 are, by way of example, metal discs arranged on a glass surface. The disc dimensions 525 and distances 526 between the discs are known. A regular pattern 527 is visible in the sample. Put differently, the discs are arranged in a periodic arrangement in which straight lines of discs are visible in a square pattern 528.

FIG. 5*b* illustrates an image representation 562 of the calibration sample 520. The image representation 562 may be understood as the second image representation as described above. In more detail, the image representation 562 shows an optical image of structural elements 524 of the calibration sample 520 as acquired by the optical detection system 110 of the OCT system 100. The inset 514 of FIG. 5*b* shows a lateral scanning distortion 568 of the image representation 562 in close up. The inset 514 corresponds to the leftmost part of the image representation 562, as illustrated by the square frame. In more detail, the square pattern 528 of FIG. 5*a* appears to be curved 530 in the image representation 526. By applying the method 400 as described above the lateral distortion 568 may be corrected for, as illustrated in the calibrated lateral image 576 in FIG. 5*c*. The inset 516 of FIG. 5*b* illustrates the corrected lateral scanning distortion. In more detail, the curvature 530 of FIG. 5*a* is reduced such that a square pattern 528 is visible in FIG. 5*c*.

In more detail, the correction was achieved by a correction of the scanner artifact using a 7th order polynomial curve fitting. By adjusting the second set of scanner parameters, as described above based on the curve fitting, a calibrated set of scanner parameters was obtained. Put differently, the drive voltages for deflecting the scanning arrangement was adjusted based on the curve fitting.

Figure 6:
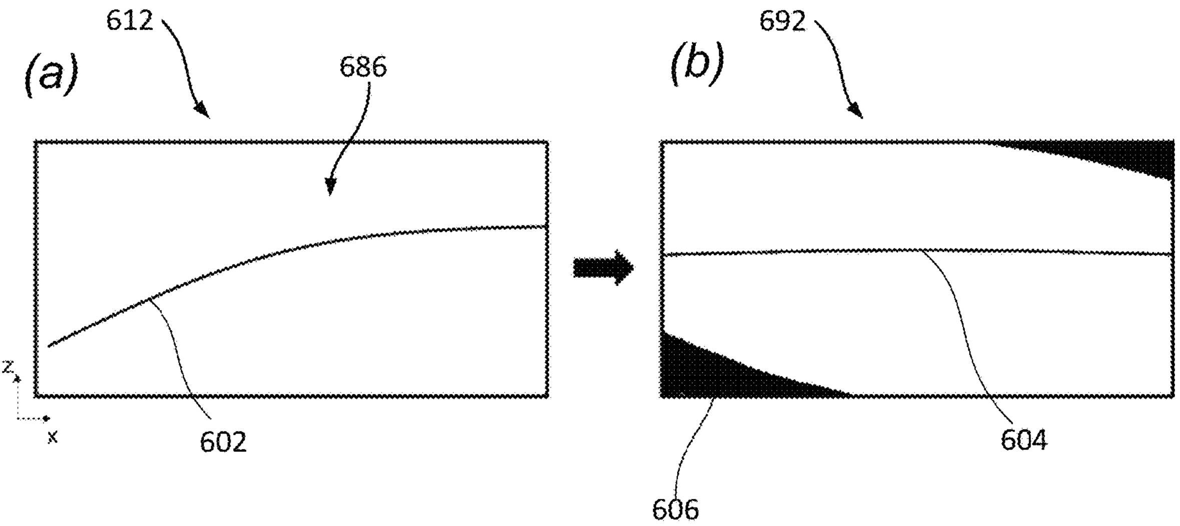
FIG. 6 illustrates by way of example an axial scanning distortion in an OCT image obtained by the OCT system.

FIG. 6*a* illustrates by way of example an axial scanning distortion 686. Put differently, FIG. 6*a* illustrate OPLD curvature in a cross-sectional image 612. The lines 602 illustrates a curved line. The line 602 represent an image representation of a flat sample which appears curved due to OPLD based artefacts.

By applying the method 400 as described above, axial scanning distortions may be corrected for. FIG. 6*b*, illustrates a calibrated axial image 692. In more detail, the correction of the curvature has been achieved by fitting the line 602 using a mathematic representation such as a curve fitting function and shifting each axial scan in the image representation to correct for the OPLD based artefacts. A straighter line 604 is thereby obtained. The image representation of the calibrated axial image 692 of FIG. 6*b* comprises zero-paddings 606 to maintain image dimensions.

Figure 7:
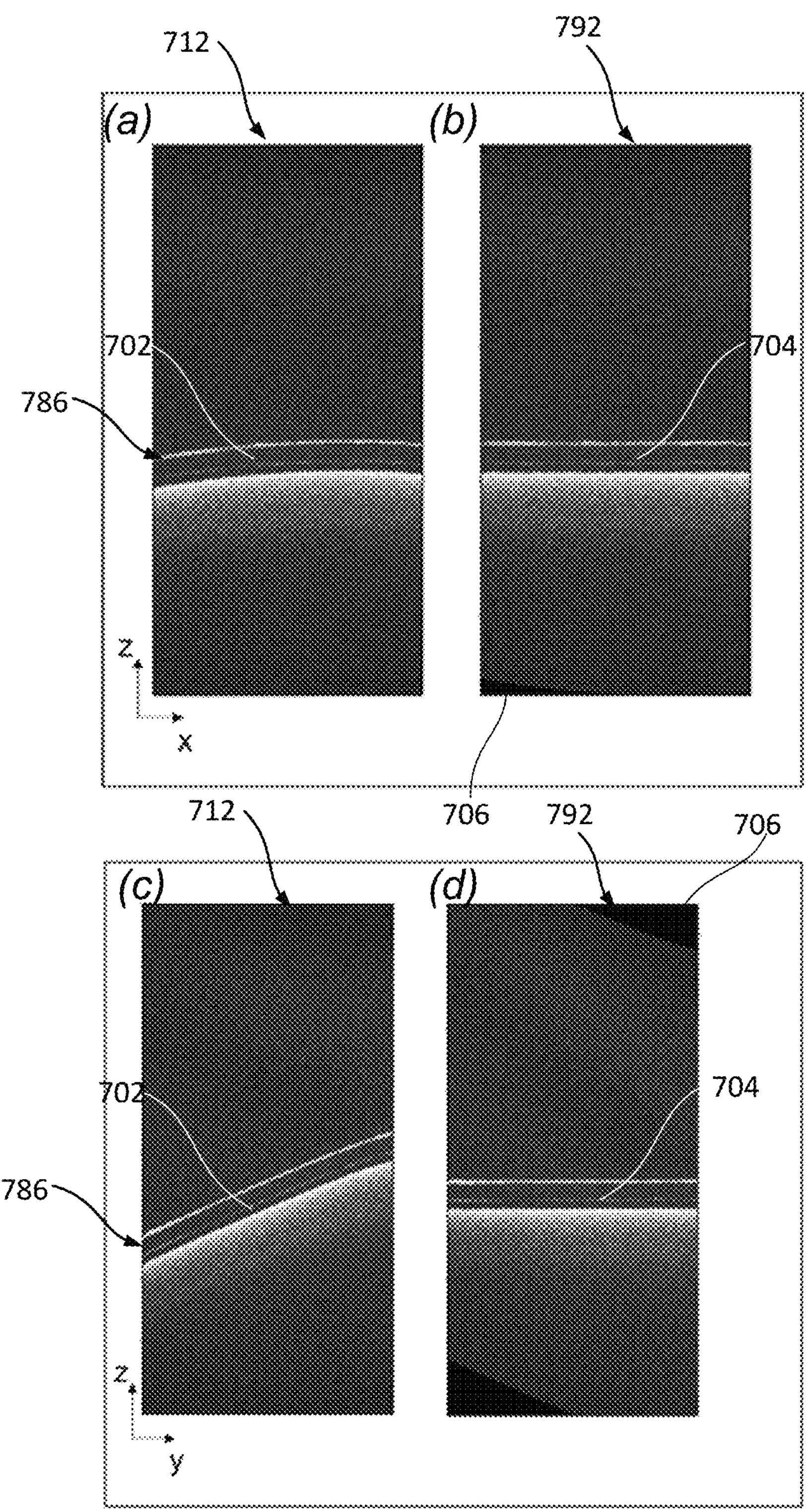
FIG. 7 illustrates by way of example axial scanning distortion in OCT images obtained by the OCT system.

By way of example, FIG. 7 illustrates an axial scanning distortion 786 obtained experimentally. In more detail, FIG. 7*a* illustrates optical path length difference (OPLD) curvature in an OCT image 712 of a flat sample. The OCT image 712 illustrated axial image data along an X-axis. The OPLD between the reference and the sample light beam generate the axial (Z-axis) information of the sample along the axial direction of the beam as it is scanned over the sample along the X-axis. The flat sample is here exemplified by a laminated card on a flat surface. The flat sample appears in the OCT image 712 as a curved line 702. Put differently, the curved line 702 may be understood as an image representation of a flat sample. The line 702 appears curved due to OPLD based artefacts om the OCT system 100. In other words, the obtained image has some Z-curvature. By applying the method 400 as described above, axial scanning distortion 786 may be corrected for. FIG. 7*b*, illustrates a calibrated axial image 792. In more detail, the correction of the curvature has been achieved by fitting the line 702 using a mathematic representation such as a curve fitting function and shifting each axial scan in the image representation to correct for the OPLD based artefacts. A straighter line 704 is thereby obtained. The image representation 712 of FIG. 7*b* comprises zero-paddings 706 to maintain image dimensions.

FIGS. 7*c* and 7*d* illustrate the OCT images 712, 792 of the same sample as in FIGS. 7*a* and 7*b*, but for an orthogonal scan. Put differently, the OCT images 712 of FIGS. 7*c* and 7*d* illustrate axial image data along a Y-axis. Optical path length differences (OPLD) between the reference and the sample light beam generate the axial (Z-axis) information of the sample along the axial direction of the beam as it is scanned over the sample along the Y-axis.

The flat sample appears also in the Y-scan as a tilted and curved line 702. Put differently, the line 702 may be understood as an image representation of a flat sample. The line 702 appears curved due to OPLD based artifacts om the OCT system 100. By applying the method 400 as described above, axial scanning distortion 786 may be corrected for. FIG. 7*d*, illustrates a calibrated axial image 792. In more detail, the correction of the curvature has been achieved by fitting the line 702 using a mathematic representation such as a curve fitting function and shifting each axial scan in the image representation to correct for the OPLD based artefacts. A straighter line 704 is thereby obtained. The calibrated axial image 792 of FIG. 7*d* comprises zero-paddings 706 to maintain image dimensions.

Figure 8:
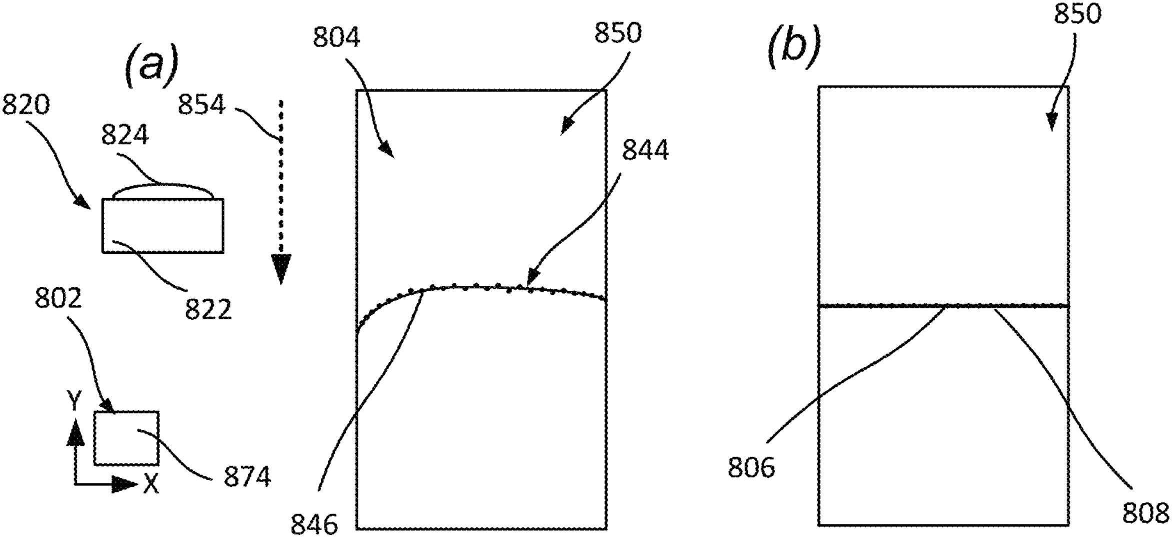
FIG. 8 illustrates by way of example an OCT image obtained by the OCT system.

FIG. 8 illustrates by way of example an OCT image obtained by the OCT system. With reference to FIG. 8 and FIG. 4, the method 400 may comprise: providing 434 a calibration sample 820 comprising substrate 822 having a curved structural element 824 thereon, see FIG. 8*a*. The curved structural element 824 may be an anatomical layer in a specimen.

The method 400 further comprises scanning 436, using the calibrated set of scanner parameters 874, the sample light beam 106 laterally across a fourth two-dimensional scan area 802 pertaining to the desired field of view, FoV, 850 such that a fourth image representation 804 of the curved structural element 824 of the calibration sample 820 is acquired by the optical detection system 110. The method 400 further comprises identifying 438 a curved structural feature 844 pertaining to the curved structural element 824 of the calibration sample 820 in the fourth image representation 804. The curved structural feature 844 is illustrated by circular data points 846 as acquired by the OCT system 100. The method 440 further comprises determining 440 axial position values along the axial direction 854 for the curved structural feature 844 across the desired field of view, FoV, 850 and obtaining 442 a mathematical relationship for the determined axial position values for the curved structural feature 844.

The method further comprises applying 444 a flattening transformation on the mathematical relationship for the determined axial position values to obtain a constant axial position value 806 along the curved structural feature 844 such that an image representation comprising an iso-surface 808 for the curved structural feature 844 is obtained, see FIG. 8*b*.

As described above, the method 400 allows for axial curvature calibration.

The method 400 may be applied for optical sectioning of anatomical layers in a curved sample, such as the cornea or retina. Put differently, by detecting a curved feature of interest, such as the inner retinal layer or corneal epithelium, and computing an axial shift (Z-shift) in the image representation of the curved structural feature 844 at each position may allow a similar flattening. By way of example, this may enable optical sectioning in the XY plane and creation of en face images that are contoured to the sample curvature allowing visualization of iso-surfaces for different anatomical layers. Detecting the desired curved surface element may be done on a subset of OCT images from a 3D volume. The flattening transformation may comprise a curve fitting as described above. The flattening achieved by the method may allow for extrapolation of the surface position to all images within the 3D volume.

According to a second aspect of this disclosure a Computer program with a program code for performing the method 400 when the computer program is run on a processor is provided.

Figure 9:
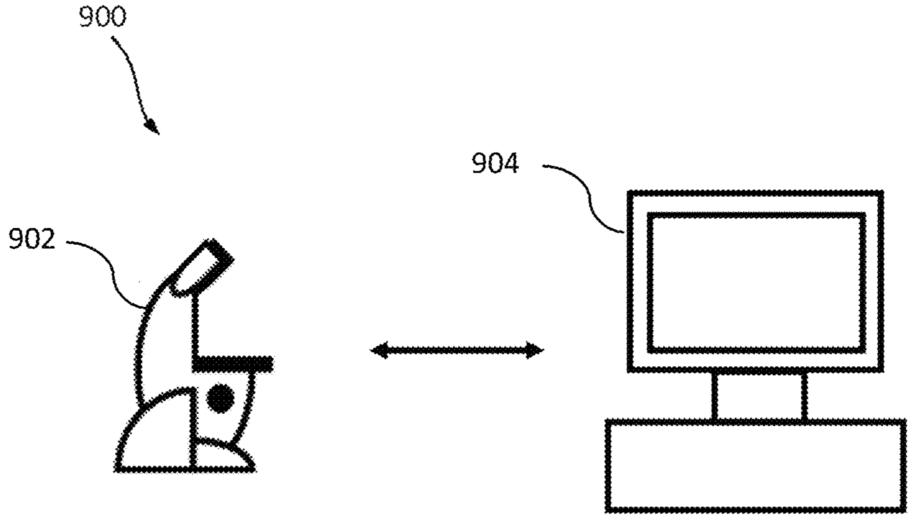
FIG. 9 shows a schematic illustration of a system configured to perform a method described herein.

Some embodiments relate to a microscope comprising a system as described in connection with one or more of the FIGS. 1 to 8. Alternatively, a microscope may be part of or connected to a system as described in connection with one or more of the FIGS. 1 to 8. FIG. 9 shows a schematic illustration of a system 900 configured to perform a method described herein. The system 900 comprises a microscope 902 and a computer system 904. The microscope 902 is configured to take images and is connected to the computer system 904. The computer system 904 is configured to execute at least a part of a method described herein. The computer system 904 may be configured to execute a machine learning algorithm. The computer system 904 and microscope 902 may be separate entities but can also be integrated together in one common housing. The computer system 804 may be part of a central processing system of the microscope 902 and/or the computer system 904 may be part of a subcomponent of the microscope 902, such as a sensor, an actor, a camera or an illumination unit, etc. of the microscope 902. The computer system 904 may be the computer system 126 described in relation to FIG. 1.

The computer system 904 may comprise the image acquisition unit described above. The computer system 904 may comprise a processor described above.

The computer system 904 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 904 may comprise any circuit or combination of circuits. In one embodiment, the computer system 904 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 904 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 904 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 904 may also include a display device, one or more speakers, and a keyboard and/or controller, which can include a mouse, trackball, touch screen, voice-recognition device, or any other device that permits a system user to input information into and receive information from the computer system 904.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements. e.g., A and B. or the entire list of elements A. B and C.

The invention claimed is:

1. A method for three-dimensional (3D) image calibration for a spectral domain optical coherence tomography (OCT) system, the OCT system including a scanning arrangement configured to laterally scan a sample light beam across a surface of a sample, an optical detection system configured to detect light reflected back from the sample to obtain an optical image of the sample, and a reference light beam, the OCT system being configured to generate axially resolved optical information from the sample as the sample light beam is scanned laterally across the sample using optical path length differences (OPLD) between the reference light beam and the sample light beam, the method comprising:

providing a first calibration sample comprising a first substrate having laterally arranged structural elements providing optical contrast, the structural elements having at least one of known dimensions or known position values on the substrate;

scanning, using a first set of scanner parameters for the scanning arrangement, the sample light beam laterally across a first two-dimensional scan area of the calibration sample so as to acquire a first image representation of the structural elements of the calibration sample by the optical detection system;

identifying first structural features in the first image representation pertaining to the structural elements of the calibration sample;

adjusting the first set of scanner parameters based on identified first structural features in the first image representation to obtain a desired field of view (FoV), thereby obtaining a second set of scanner parameters;

scanning, using the second set of scanner parameters, the sample light beam laterally across a second two-dimensional scan area pertaining to the desired field of view (FoV), so as to acquire a second image representation of the structural elements of the calibration sample by the optical detection system;

identifying second structural features in the second image representation of the structural elements of the calibration sample;

correlating the at least one of the known dimensions or the known position values on the substrate for the structural elements corresponding to the identified second structural features in the second image representation with corresponding scanner parameter values from the second set of scanner parameters;

obtaining a mathematical relationship between the at least one of the known dimensions or the known position values and the corresponding scanner parameter values to calculate a lateral scanning distortion across the desired field of view (FoV);

correcting the lateral scanning distortion by adjusting the scanner parameters of the second set of scanner parameters using the mathematical relationship so as to obtain a calibrated set of scanner parameters for obtaining calibrated lateral images with the OCT system;

providing a second calibration sample comprising a second substrate having a curved structural element thereon;

scanning, using the calibrated set of scanner parameters, the sample light beam laterally across a fourth two-dimensional scan area pertaining to the desired field of view (FoV) so as to acquire a fourth image representation of the curved structural element of the second calibration sample by the optical detection system;

identifying a curved structural feature pertaining to the curved structural element of the calibration sample in the fourth image representation;

determining axial position values along an axial direction for the curved structural feature across the desired field of view (FoV);

obtaining a mathematical relationship for the determined axial position values for the curved structural feature; and applying a flattening transformation on the mathematical relationship for the determined axial position values to obtain a constant axial position value along the curved structural feature so as to obtain an image representation comprising an iso-surface for the curved structural feature.

2. The method of claim 1, wherein the calibrated set of scanner parameters for the scanning arrangement pertains to drive voltages for deflecting the scanner arrangement.

3. The method of claim 1, wherein the scanner arrangement comprises a scanning mirror arrangement controlled by a scan controller.

4. The method according claim 1, wherein the identifying of the first structural features in the first image representation comprises at least one of filtering, thresholding, or smoothening image data of the first image representation.

5. The method of claim 1, further comprising:

providing a third calibration sample comprising a third substrate having at least one third structural element extending laterally on the third substrate thereby providing optical contrast, the at least one third structural element having known axial position values along the third substrate, the known axial positions values being in the axial direction, the axial direction being perpendicular to the lateral scan of the sample light beam;

scanning, using the calibrated set of scanner parameters, the sample light beam laterally across a third two-dimensional scan area pertaining to the desired field of view (FoV) so as to acquire a third image representation of the at least one third structural element by the optical detection system;

determining third axial position values along the axial direction for the at least one third structural element across the desired field of view (FoV);

obtaining a mathematical relationship between the known axial position values and the determined third axial position values to calculate an axial scanning distortion across the desired field of view (FoV); and correcting the axial scanning distortion by adjusting the determined third axial position values using the mathematical relationship to compensate for changes in optical path length during the scanning across the third two-dimensional scan area so as to obtain calibrated axial position values for the OCT system.

6. The method of claim 5, wherein the determining of third axial position values for the at least one third structural element of the calibration sample comprises:

identifying minimum intensity, maximum intensity, or a maximum difference in intensity along the axial direction across the desired field of view (FoV).

7. The method of claim 5, wherein the at least one third structural element comprises a surface the third substrate of the third calibration sample.

8. The method of claim 1, wherein the structural elements are formed by uniformly sized and/or regularly spaced protruding elements.

9. The method of claim 1, wherein the substrate of the calibration sample comprises a flat substrate.

10. The method of claim 1, wherein the mathematical relationship comprises a curve fitting function.

11. The method of claim 10, wherein the curve fitting function comprises a polynomial function.

12. The method of claim 10, further comprising:

assessing by mathematical analysis a quality of the curve fitting function.

13. The method of claim 1, wherein the curved structural element comprises an anatomical layer in a specimen.

14. One or more non-transitory computer-readable mediums having processor-executable instructions stored thereon, wherein the processor-executable instructions, when executed, facilitate performance of the method of claim 1.

* * * * *